United States Patent
Metke et al.

(10) Patent No.: US 8,161,283 B2
(45) Date of Patent: Apr. 17, 2012

(54) METHOD AND DEVICE FOR ESTABLISHING A SECURE ROUTE IN A WIRELESS NETWORK

(75) Inventors: Anthony R. Metke, Naperville, IL (US); Randy L. Ekl, Lake Zurich, IL (US); Michael F. Korus, Eden Prairie, MN (US); Aparna Pandey, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1009 days.

(21) Appl. No.: 11/680,359

(22) Filed: Feb. 28, 2007

(65) Prior Publication Data

US 2008/0205312 A1 Aug. 28, 2008

(51) Int. Cl.
*H04L 9/32* (2006.01)

(52) U.S. Cl. ........ 713/169; 713/153; 713/168; 713/170; 726/4; 380/370; 370/338; 370/406; 455/410; 455/411

(58) Field of Classification Search ................. 455/41.1, 455/41.2, 410, 411, 414.1, 435.1, 435.2, 455/445, 466, 502, 517, 524; 726/2–4, 17, 726/21; 713/153, 155, 168–171; 370/230, 370/252, 328, 329, 338, 348, 351, 395.21, 370/395.5, 396, 400, 401, 406
See application file for complete search history.

(56) References Cited

U.S. PATENT DOCUMENTS

| | | | |
|---|---|---|---|
| 7,181,614 B1 * | 2/2007 | Gehrmann et al. | 713/155 |
| 7,506,370 B2 * | 3/2009 | Aggarwal | 726/14 |
| 7,522,551 B2 * | 4/2009 | Giaimo et al. | 370/328 |
| 7,561,551 B2 * | 7/2009 | Metke et al. | 370/331 |
| 7,792,050 B2 * | 9/2010 | Metke et al. | 370/252 |
| 7,793,103 B2 * | 9/2010 | Fu et al. | 713/171 |
| 7,995,546 B2 * | 8/2011 | Walker et al. | 370/338 |
| 8,001,381 B2 * | 8/2011 | Metke et al. | 713/169 |
| 2003/0037167 A1 * | 2/2003 | Garcia-Luna-Aceves et al. | 709/238 |
| 2006/0072569 A1 * | 4/2006 | Eppinger et al. | 370/389 |
| 2006/0094401 A1 * | 5/2006 | Eastlake, III | 455/411 |
| 2007/0206537 A1 * | 9/2007 | Cam-Winget et al. | 370/331 |
| 2007/0250713 A1 * | 10/2007 | Rahman et al. | 713/171 |
| 2008/0065777 A1 * | 3/2008 | Sherkin et al. | 709/229 |
| 2009/0164785 A1 * | 6/2009 | Metke et al. | 713/169 |

OTHER PUBLICATIONS

PCT International Search Report Application No. PCT/US2008/053531 Dated Nov. 11, 2008—18 pages.
Chakeres I and Perkins C: Dynamic Manet On-Demand (DYMO) Routing Dated Feb. 9, 2007—32 pages.
Ghazizadeh S et al: Security-Aware Adaptive Dynamic Source Routing Protocol Dated Nov. 6, 2005—10 pages.
Forsberg D et al: Distributing Mobility Agents Hierarchically Under Frequent Location Updates Dated Nov. 15, 1999—10 pages.

* cited by examiner

*Primary Examiner* — Anthony Addy (74) *Attorney, Agent, or Firm* — Randi L. Karpinia (57) ABSTRACT

A method for establishing a secure route in a wireless network as provided improves network efficiency. According to one aspect, the method includes receiving at a first node in the wireless network a route request message from a second node, where the second node and the first node have not been mutually authenticated. The route request message is then forwarded from the first node to a third node. A route reply message is then received at the first node from the third node. The first node is then mutually authenticated with the second node in response to receiving the route reply message at the first node.

15 Claims, 9 Drawing Sheets

| DESTINATION | METRIC | IMTERFACE | NEXT HOP | CLASS |
|---|---|---|---|---|
| XXX.XX.X.X /XX | 5 | ETH0 | XX.X.X.X | ER |
| XXX.XX.X.X /XX | 7 | ETH0 | XX.X.X.X | NR |
| XXX.XX.X.X /XX | 25 | ETH0 | XX.X.X.X | NR |
| XXX.XX.X.X /XX | 2 | ETH0 | XX.X.X.X | NR |
| XXX.XX.X.X /XX | 16 | ETH0 | XX.X.X.X | NR |

METHOD AND DEVICE FOR ESTABLISHING A SECURE ROUTE IN A WIRELESS NETWORK

FIELD OF THE INVENTION

The present invention relates generally to transmitting data through wireless networks, and in particular to establishing a secure route in an ad hoc wireless network while optimizing network efficiency for authentication processes.

BACKGROUND

Mobile devices such as cellular phones, personal digital assistants (PDAs) and notebook computers often require authentication when accessing remote databases or networks. Devices are generally authenticated through an Infrastructure Access Point (IAP), such as a base station, which is connected to an authentication server. An authentication request can be transmitted for example using an Extensible Authentication Protocol (EAP) comprising EAP Over Local Area Network (EAPOL) packets. The authentication process involves several EAPOL packets being transmitted and received, beginning with an EAP Start packet and finishing with either an EAP Success message packet or an EAP Failure message packet. The authentication server stores the authentication credentials of a mobile device (typically called a supplicant) that is being authenticated. Authentication servers also can be connected to other authentication servers to obtain supplicant authentication credentials that are not stored locally.

In prior systems, a centralized procedure is followed where a single IAP handles an authentication process for all supplicants within range of the IAP. For example, prior systems which adhere to American National Standards Institute/Institute of Electrical and Electronics Engineers (ANSI/IEEE) 802.1X or ANSI/IEEE 802.11i standards utilize such a centralized procedure. Because every supplicant can be authenticated only via an IAP, such a centralized procedure is not practical in wireless communication networks, such as ad hoc wireless communication networks, that have nodes operating outside of the wireless range of an IAP. Ad hoc wireless communication networks thus often involve complex mutual authentication methods performed between all neighboring network nodes, which can consume significant time and processor resources of the network nodes.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to establishing a secure route in a wireless network. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of establishing a secure route in a wireless network as described herein. The non-processor circuits may include, but are not limited to, a radio receiver, a radio transmitter, signal drivers, clock circuits, power source circuits, and user input devices. As such, these functions may be interpreted as steps of a method for establishing a secure route in a wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

According to one aspect, some embodiments of the present invention define a method that includes receiving at a first node in a wireless network a route request message from a second node, where the second node and the first node have not been mutually authenticated. The route request message is then forwarded from the first node to a third node. A route reply message is then received at the first node from the third node. The first node is then mutually authenticated with the second node. A make route normal message is then transmitted from the first node to the third node, wherein the make route normal message indicates that the first node and the second node have been mutually authenticated. The method thus enables nodes in a wireless communication network to form security associations with only particular neighboring nodes, which improves network efficiency by reducing time and processor resources that could be otherwise required to mutually authenticate all neighboring nodes. Nodes that authenticate with a network can thus maintain only an initial security association with the network, until a routing event triggers a need for a new security association.

According to another aspect, some embodiments of the present invention define a method for establishing a temporary route in a wireless network. The method comprises defining a multi-class routing table that identifies at least one route in the wireless network as an ephemeral route, where at least one wireless link in the at least one route is a non-secure wireless link. The multi-class routing table is then used to transmit routing information over the at least one route.

Figure 1:
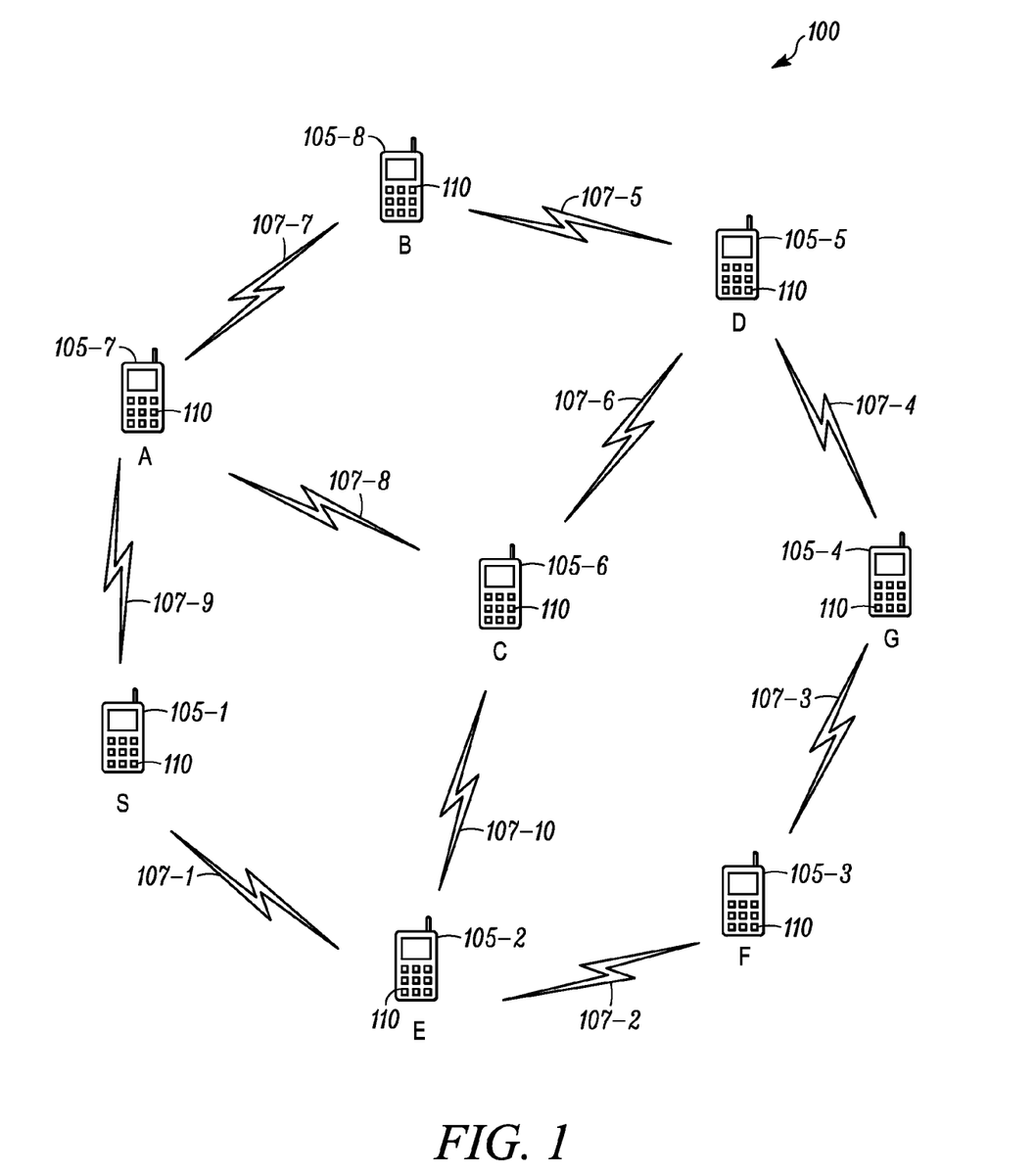
FIG. 1 is a schematic diagram illustrating a wireless communication network, according to some embodiments of the present invention.

Referring to FIG. 1, a schematic diagram illustrates a wireless communication network 100, according to some embodiments of the present invention. The wireless communication network 100 includes a plurality of nodes 105-*n* (i.e., nodes 105-1 to 105-8) labeled S and A through G that function as wireless communication devices. A transmission indication 107-*n* positioned between two nodes 105-*n* represents that the two nodes 105-*n* are in direct radio frequency (RF) range of each other. Thus if a transmission indication 107-*n* is not shown between two nodes 105-*n*, then the two nodes 105-*n* are not in direct RF range of each other and can communicate with each other only by transmitting signals through one or more intermediate nodes 105-*n*.

According to some embodiments, the wireless communication network 100 can comprise a Mobile Ad Hoc Network (MANET). MANETs are formed by autonomous collections of mobile devices that communicate with each other over wireless links having limited bandwidths. MANETs are usually temporary packet radio networks that do not involve significant supporting infrastructure and in which the user nodes themselves perform routing functions. For example, the nodes 105-*n* can be each associated with a member of a response team that has just arrived at an incident scene. The incident scene may include for example a crime scene, fire scene, accident scene, biological or chemical hazard scene, or another type of emergency or otherwise critical scene. The members of such a response team may include members from different organizations. For example the first node 105-1 may be associated with a local police officer, and the second node 105-2 may be associated with an ambulance driver from a local hospital. To enable the first node 105-1 and the second node 105-2 to quickly trust each other, they need to complete a secure authentication process. It will be appreciated that the MANET alternatively can comprise any temporary network such as at a construction site, a mining site, a military zone, or at an event such as a sports event, concert event, or the like, and can include a temporary network of individuals with handheld devices or of vehicles such as in a vehicular area network (VAN), or a combination of stationary devices, handheld or portable devices, and vehicular devices. As described in more detail below, each node 105-*n* comprises computer readable program code components 110 for establishing a secure route in the wireless communication network 100.

As known by those skilled in the art, ad hoc wireless networks such as MANETs generally do not include traditional network infrastructure such as base stations, so it can be challenging for ad hoc network nodes to authenticate each other using prior art techniques such as Extensible Authentication Protocol Over Local Area Network (EAPOL) packets. Thus, mutual authentication between nodes in an ad hoc network can be a time consuming and processor intensive process. Further, some network topologies are rich in connectivity, so that each node in a network may have many neighbors. In such networks it can be inefficient for each node to mutually authenticate and form a security association with each of its neighbors. As described in detail below, some embodiments of the present invention enable an ad hoc wireless network node to select one or more preferred nodes with which to mutually authenticate and form a security association. Additional security associations are then formed only when a routing event triggers a need for such additional security associations.

According to some embodiments of the present invention, consider that the S node 105-1 is a sending node that broadcasts a route request (RREQ) message targeted for the F node 105-3, and the RREQ message is relayed from the S node 105-1, through the E node 105-2, and to F node 105-3. The F node 105-3 then responds with a route reply (RREP) message that is intended to retrace a path through the wireless communication network 100 taken by the RREQ message. However, any transmitting node of the RREP message that does not have a security association with an intended next hop receiving node 105-*n* defers forwarding the RREP message and initiates an authentication process with the intended next hop receiving node 105-*n*. Further, the nodes 105-*n* store ephemeral route descriptions that are used only for forwarding routing information, such as RREP messages, and are not used for forwarding user data packets.

Figure 2:
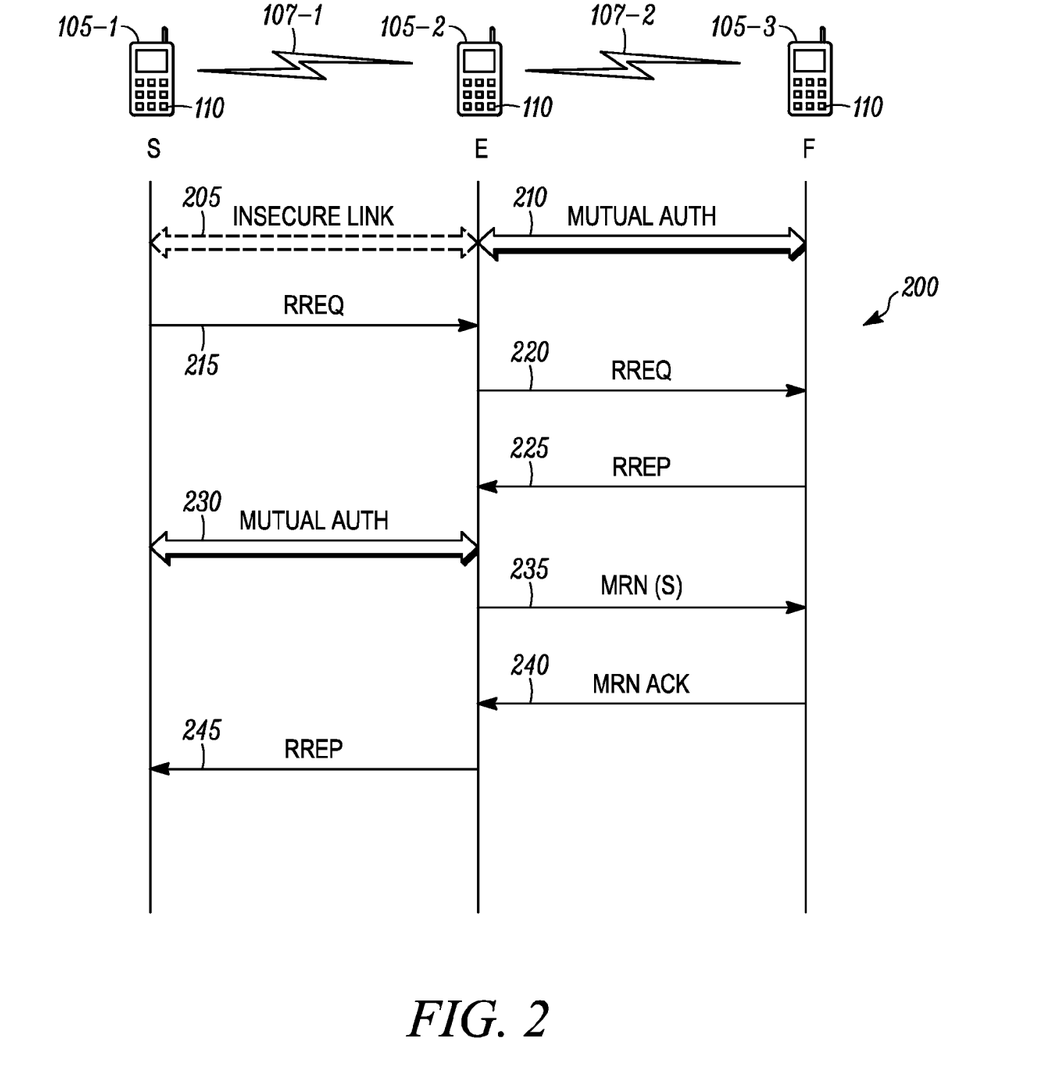
FIG. 2 is a message sequence chart illustrating a method for establishing a secure route in a wireless communication network, according to some embodiments of the present invention.

Referring to FIG. 2, a message sequence chart illustrates a method 200 for establishing a secure route in the wireless communication network 100, according to some embodiments of the present invention. Line 205 represents that a non-secure RF link exists between the S node 105-1 and the E node 105-2. Line 210 represents that the E node 105-2 and the F node 105-3 have been mutually authenticated. At line 215, the S node 105-1 transmits to the E node 105-2 an RREQ message targeted for the F node 105-3. The RREQ message can be transmitted in the clear, meaning that no particular security measures are required to protect the contents of the RREQ message. The E node 105-2 therefore indicates in its routing table that a direct route to the S node 105-1 is a non-secure, "ephemeral" route ("ER(S)"). An ephemeral route is thus a non-secure route over which network control data traffic such as routing information may be transmitted, but over which user data traffic should not be transmitted. An ephemeral route is thus distinguished from an unrestricted route, over which user data packets can be transmitted.

At line 220, the E node 105-2 forwards the RREQ message to the F node 105-3. Based on an indication in the RREQ message, the F node 105-3 stores in its routing table an indication that a path traversed by the RREQ included a non-secure wireless link, designated as an ephemeral route to the S node 105-1 ("ER(S)"). Because the E node 105-2 and the F node 105-3 are mutually authenticated, at line 225 the F node 105-3 is able to immediately transmit an RREP message back to the E node 105-2. However, because only a non-secure link exists between the E node 105-2 and the S node 105-1, at line 230 the E node 105-2 and the S node 105-1 complete a mutual authentication process before the RREP message is forwarded to the S node 105-1. Thus the receipt of the RREP message, at line 225, by the E node 105-2 triggers the mutual authentication process at line 230. That conserves processor and time resources in the network 100, because all nodes 105-n in the network 100 are not required to mutually authenticate with all neighboring nodes 105-n to enable secure transmission of a particular RREP message.

At line 235, the E node 105-2 transmits to the F node 105-3 a make route normal to S (MRN(S)) message, indicating that the E node 105-2 and the S node 105-1 have been mutually authenticated. The F node 105-3 therefore changes its routing table to indicate that a trusted, unrestricted, "normal" route ("NR(S)") to the S node 105-1 now exists. A make route normal message is thus any message that indicates that a network path that previously included at least one non-secure wireless link now includes only secure wireless links. At line 240, the F node 105-3 transmits a make route normal acknowledgment (MRN ACK) message back to the E node 105-2. At line 245, the E node 105-2 then forwards the RREP message to the S node 105-1.

Figure 3:
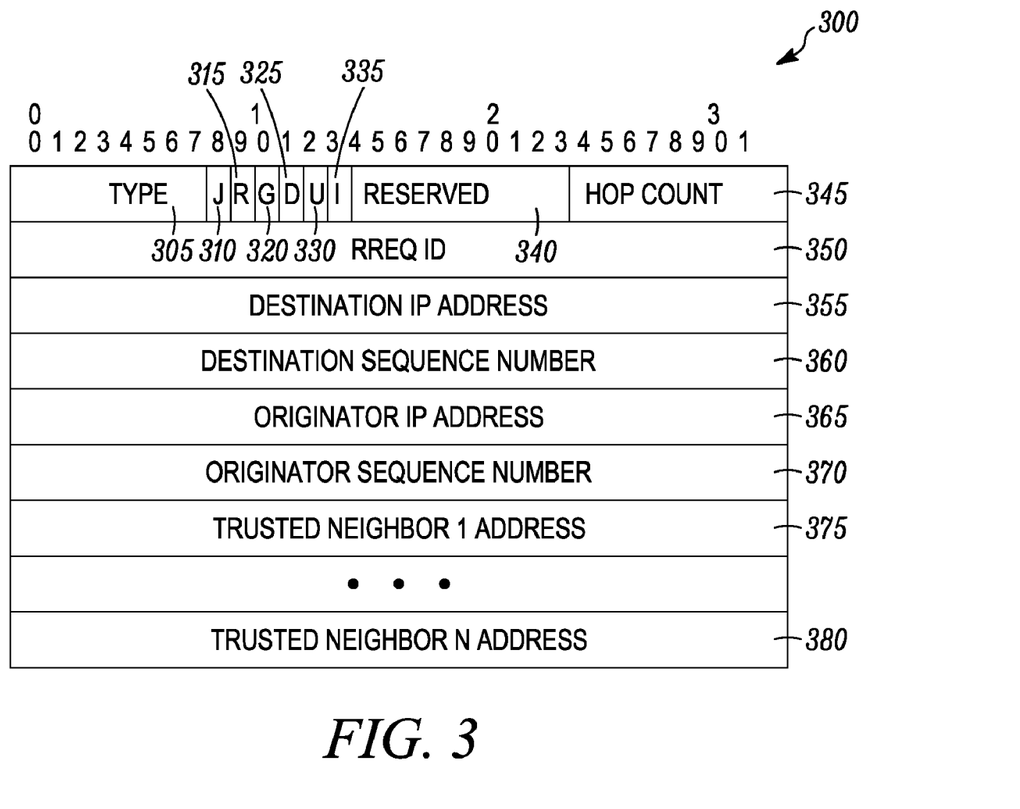
FIG. 3 is a block diagram illustrating a route request (RREQ) message, according to some embodiments of the present invention.

Referring to FIG. 3, a block diagram illustrates an RREQ message 300, according to some embodiments of the present invention. For example, the RREQ message 300 includes a type field 305; a join flag 310 reserved for multicast use; a repair flag 315 reserved for multicast use; a gratuitous RREP flag, which indicates whether a gratuitous RREP message should be unicast to a specified node; a destination only flag 325, which indicates that only a destination internet protocol (IP) address may respond to the RREQ message 300; an unknown sequence number field 330, which indicates that a destination sequence number of the RREQ message 300 is unknown; and an insecure link indication (ILI) field 335, which indicates whether the RREQ message 300 has previously traversed a non-secure wireless link.

The ILI field 335 thus can be included as a flag in a header of the RREQ message 300, and indicates whether a path traversed by the route request message 300 includes a non-secure wireless link. For example, if the ILI field 335 is set to "0" ("false") then a node 105-n that receives the RREQ message 300 can recognize that the RREQ message 300 had not previously traversed a non-secure wireless link in the wireless communication network 100. If the ILI field 335 is set to "1" ("true") then a node 105-n that receives the RREQ message 300 can recognize that the RREQ message 300 had previously traversed a non-secure wireless link in the wireless communication network 100. According to some embodiments of the present invention, if the ILI field 335 is set to "false" and the RREQ message 300 was received over a non-secure wireless link, then a node 105-n processing the RREQ message 300 changes the ILI field 335 to "true" before forwarding the RREQ message 300. Generally, a node 105-n that originates an RREQ message will set the ILI field 335 to "false" before transmitting the RREQ message, and only a node 105-n that changes the ILI field 335 to "true" will originate a make route normal (MRN) message.

The RREQ message 300 further includes a reserved field 340; a hop count field 345, which indicates a number of hops from an originator internet protocol (IP) address to a present node that is processing the RREQ message 300; a RREQ identification (ID) field 350, which is a sequence number that uniquely identifies the RREQ message 300 when used in conjunction with an originator IP address; a destination IP address field 355, which provides an IP address of a destination node for which a route is desired; a destination sequence number field 360, which provides a latest sequence number received by an originator IP address concerning any route toward an address identified in the destination IP address field 355; an originator IP address field 365, which provides an IP address of a node that originated the RREQ message 300; and an originator sequence number field 370, which provides a current sequence number to be used in a route entry that points toward the originator IP address. Those skilled in the art will appreciate that although the use of IP addresses are described concerning the RREQ message 300, alternative embodiments of the present invention can use various other types of addresses, such as Medium Access Control (MAC) addresses.

The RREQ message 300 further can include a trusted neighbor list that identifies a plurality of trusted neighbor address fields, such at the fields 375 and 380. Each trusted neighbor address field 375, 380 provides an IP address of a neighboring node 105-n of a node 105-n that originated the RREQ message 300 and with which the node 105-n that originated the RREQ message 300 already has a security association. Such a trusted neighbor list can be used to identify nodes 105-n through which keying material can be transmitted to assist mutually authenticating various nodes 105-n.

Figure 4:
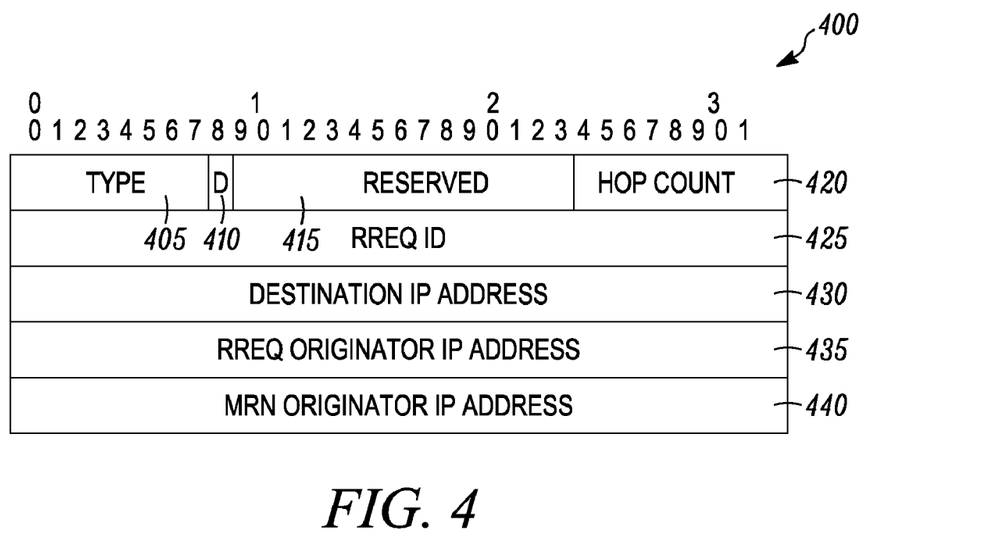
FIG. 4 is a block diagram illustrating a make route normal (MRN) message, according to some embodiments of the present invention.

Referring to FIG. 4, a block diagram illustrates a make route normal (MRN) message 400, according to some embodiments of the present invention. For example, the MRN message 400 includes a type field 405; a destination only flag 410, which indicates that only a destination internet protocol (IP) address may respond to the MRN message 400; a reserved field 415; a hop count field 420, which indicates a number of hops from an originator IP address to a present node that is processing the MRN message 400; a RREQ identification (ID) field 425, which is a sequence number that uniquely identifies the MRN message 400 when used in conjunction with an originator IP address; a destination IP address field 430, which provides an IP address of a destination node for the MRN message 400; an RREQ originator IP address field 435, which provides an IP address of a node that originated an RREQ message associated with the MRN message 400; and an MRN originator IP address field 440, which provides an IP address of a node that originated the MRN message 400.

Figure 5:
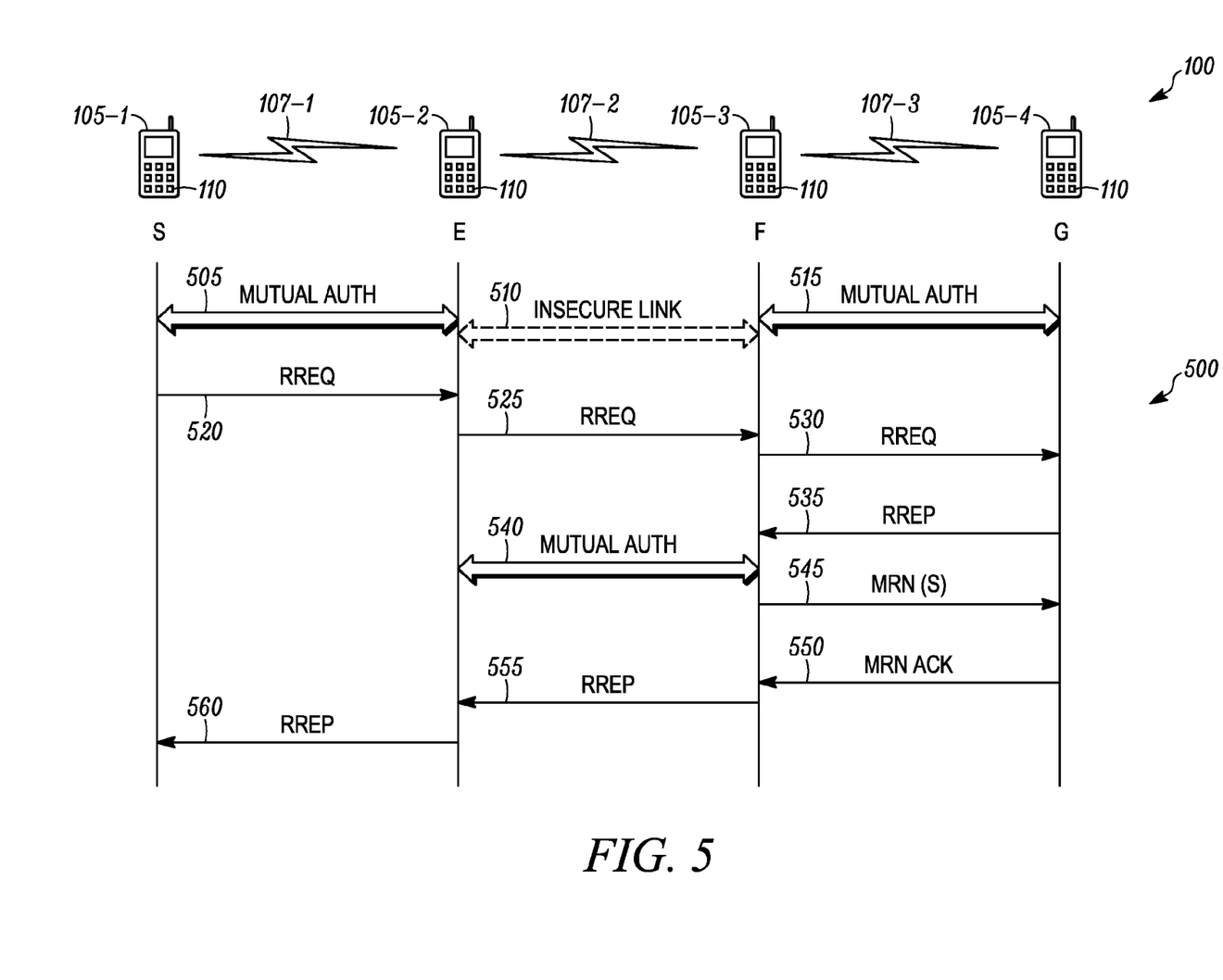
FIG. 5 is a message sequence chart illustrating a method for establishing a secure route in a wireless communication network, according to some other embodiments of the present invention.

Referring to FIG. 5, a message sequence chart illustrates a method 500 for establishing a secure route in the wireless communication network 100, according to some other embodiments of the present invention. Line 505 represents that the S node 105-1 and the E node 105-2 have been mutually authenticated. Line 510 represents that a non-secure RF link exists between the F node 105-3 and the G node 105-4. At line 520, the S node 105-1 transmits to the E node 105-2 an RREQ message targeted for the G node 105-4. The RREQ message can be transmitted in the clear, meaning that no particular security measures are required to protect the contents of the RREQ message. The E node 105-2 then can add its own IP address to a trusted neighbor list, including for example the field 375 of the RREQ message 300, identifying trusted nodes that have mutually authenticated with the S node 105-1 that originated the RREQ message. At line 525, the E node 105-2 forwards the RREQ message to the F node 105-3 across a non-secure wireless link. When the E node 105-2 receives and forwards the RREQ message, an ILI field, such as the ILI field 335 of the RREQ message 300, is set to "false" because the RREQ message has traversed only secure links. However, when the F node 105-3 receives the RREQ message across a non-secure link, because the ILI field is set to "false" the F node 105-3 will recognize that it is the first node 105-n to receive the RREQ message across a non-secure link, and the F node 105-3 will therefore change the ILI field to "true". At line 530, the F node 105-3 forwards the RREQ message to the G node 105-4. Even though the G node 105-4 received the RREQ message across a secure wireless link, as indicated by line 515, because the ILI field in the RREQ is set "true" the G node 105-4 will indicate in its routing table that a route to the S node 105-1 is a non-secure, ephemeral route ("ER(S)").

Because the G node 105-4 and the F node 105-3 are mutually authenticated, at line 535 the G node 105-4 is able to immediately transmit an RREP message back to the F node 105-3. However, because only a non-secure link exists between the F node 105-3 and the E node 105-2, at line 540 the F node 105-3 and the E node 105-2 complete a mutual authentication process before the RREP message is forwarded to the E node 105-2. Thus the receipt of the RREP message, at line 535, by the F node 105-3 triggers the mutual authentication process at line 540.

Because the F node 105-3 knows that it was the first node 105-n to receive the RREQ message across a non-secure link, based on the ILI field set to "false" in the RREQ message received at line 525, after the mutual authentication process is completed at line 540 the F node 105-3 recognizes that a route between the S node 105-1 and the G node 105-4 now can be made normal. Therefore, at line 545, the F node 105-3 transmits to the G node 105-4 a make route normal to S (MRN(S)) message. For example, the MRN message 400 can be used, where the destination IP address field 430 identifies the G node 105-4, the RREQ originator IP address field 435 identifies the S node 105-1, and the MRN originator IP address field 440 identifies the F node 105-3. The G node 105-4 therefore changes its routing table to indicate that a trusted route ("R(S)") to the S node 105-1 now exists. At line 550, the G node 105-4 transmits a make route normal acknowledgment (MRN ACK) message back to the F node 105-3. At line 555, the F node 105-3 then forwards the RREP message to the E node 105-2. Finally, at line 560, the E node 105-2 forwards the RREP message to the S node 105-1.

Figure 6:
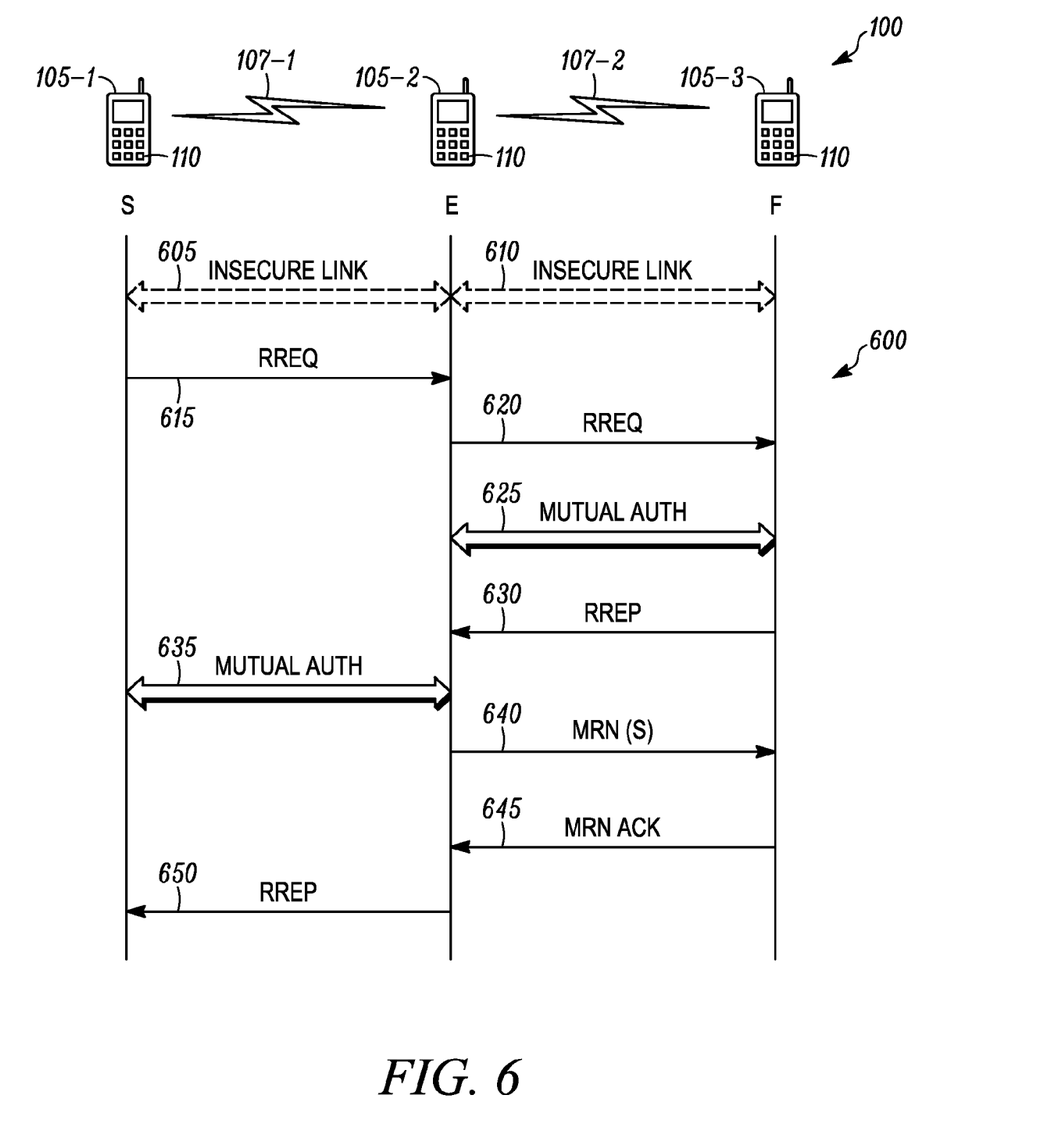
FIG. 6 is a message sequence chart illustrating a method for establishing a secure route in a wireless communication network, according to still other embodiments of the present invention.

Referring to FIG. 6, a message sequence chart illustrates a method 600 for establishing a secure route in the wireless communication network 100, according to other embodiments of the present invention. Line 605 represents that a non-secure RF link exists between the S node 105-1 and the E node 105-2. Line 610 represents that a non-secure RF link also exists between the E node 105-2 and the F node 105-3. At line 615, the S node 105-1 transmits an RREQ message to the E node 105-2, and an ILI field in the RREQ message is set to "false". At line 620, the E node 105-2 forwards the RREQ message to the F node 105-3, but first sets the ILI field to "true" because the RREQ message was received over a non-secure RF link. Because the F node 105-3 knows that it maintains only a non-secure link with the E node 105-2, at line 625 the F node 105-3 initiates a mutual authentication process with the E node 105-2. At line 630, the F node 105-3 then transmits an RREP message to the E node 105-2. Because RREP messages cannot be forwarded across a non-secure link, and the E node 105-2 knows that it maintains only a non-secure link with the S node 105-1, at line 635 the E node 105-2 then initiates a mutual authentication process with the S node 105-1.

The mutual authentication process indicated by line 635 can be assisted by a trusted neighbor list included in the RREQ message transmitted at line 615. For example, the field 375 in the RREQ message 300 can identify the A node 105-7, and the field 380 can identify the C node 105-6, as trusted neighbors of the S node 105-1. If the E node 105-2 receives the RREQ message 300 including such fields 375, 380, then the E node 105-2 can transmit keying material to the S node 105-1 through the C node 105-6 and the A node 105-7.

At line 640, because the E node 105-2 now knows that a secure path exists between S node 105-1 and the F node 105-3, an MRN message is then transmitted to the F node 105-3. At line 645, the F node 105-3 responds by sending an MRN ACK message to the E node 105-2. Finally, at line 650, the E node 105-2 forwards the RREP message to the S node 105-1.

According to an alternative embodiment of the present invention, the F node 105-3 can respond to an RREQ message, such as the RREQ message received at line 620 of the method 600, with a preliminary RREP message. The E node 105-2 may receive, from various other nodes 105-n in the wireless communication network 100, multiple preliminary RREP messages in response to the RREQ message transmitted by the E node 105-2. That enables the E node 105-2 to select a preferred transmitter, such as the F node 105-3, of one of the received preliminary RREP messages. The E node 105-2 then initiates a mutual authentication process with only the preferred transmitter. After such a mutual authentication process is completed, the E node 105-2 then can verify the validity of the preliminary RREP message received from the F node 105-3 by requesting the F node 105-3 to resend an RREP message over the mutually authenticated and secure RF link between the E node 105-2 and the F node 105-3. After such verification is completed the E node 105-2 forwards the RREP message to the S node 105-1.

Figure 7:
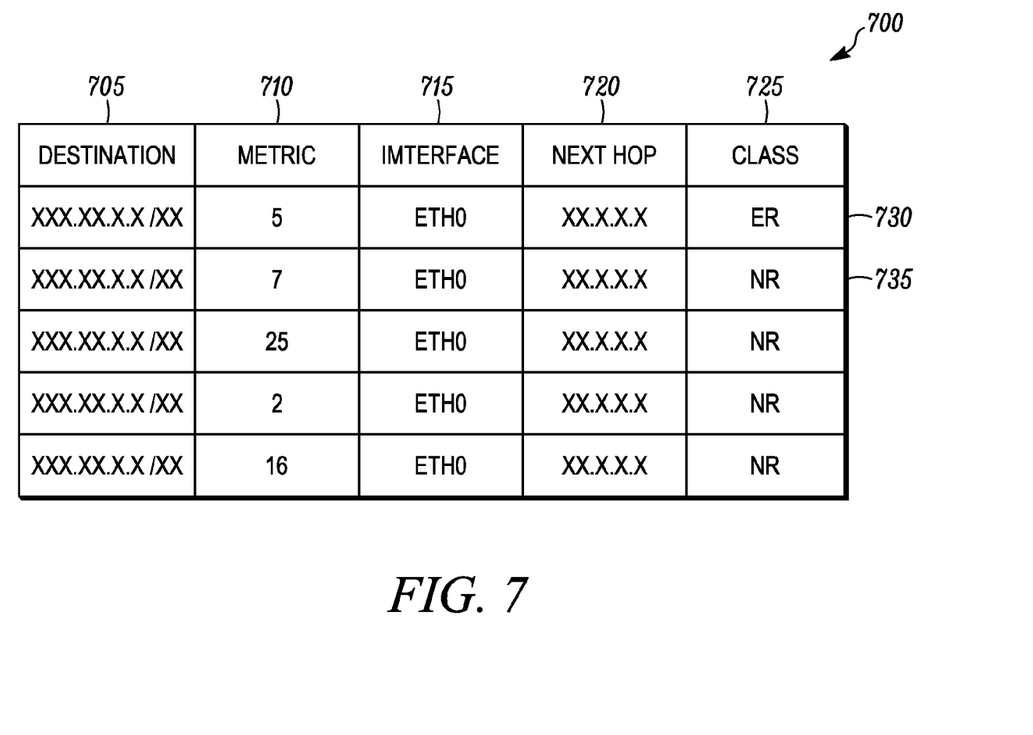
FIG. 7 is a block diagram illustrating a multi-class routing table that identifies ephemeral routes and normal routes in a wireless communication network, according to some embodiments of the present invention.

Referring to FIG. 7, a block diagram illustrates a multiclass routing table 700 that identifies ephemeral routes and normal routes in a wireless communication network, according to some embodiments of the present invention. The multiclass routing table 700 comprises a plurality of fields including the following: a destination field 705 that identifies a destination internet protocol (IP) address; a metric field 710 that identifies metric values associated with a path to a destination; an interface field 715 that identifies a network interface card connected to a destination network; a next hop field 720 that indicates an IP address of a next hop in a path to a destination; and may also include various other fields that are well known by those having ordinary skill in the art. Further, the multi-class routing table 700 includes a class field 725 that indicates a type of route, such as whether a route is a trusted, unrestricted, "normal" route, or whether a route is a non-secure, "ephemeral" route. For example, an entry 730 in the class field 725 indicates that a first route in the routing table 700 is an ephemeral route by using the designation "ER"; and an entry 735 in the class field 725 indicates that a second route in the routing table 700 is a normal route by using the designation "NR".

Figure 8:
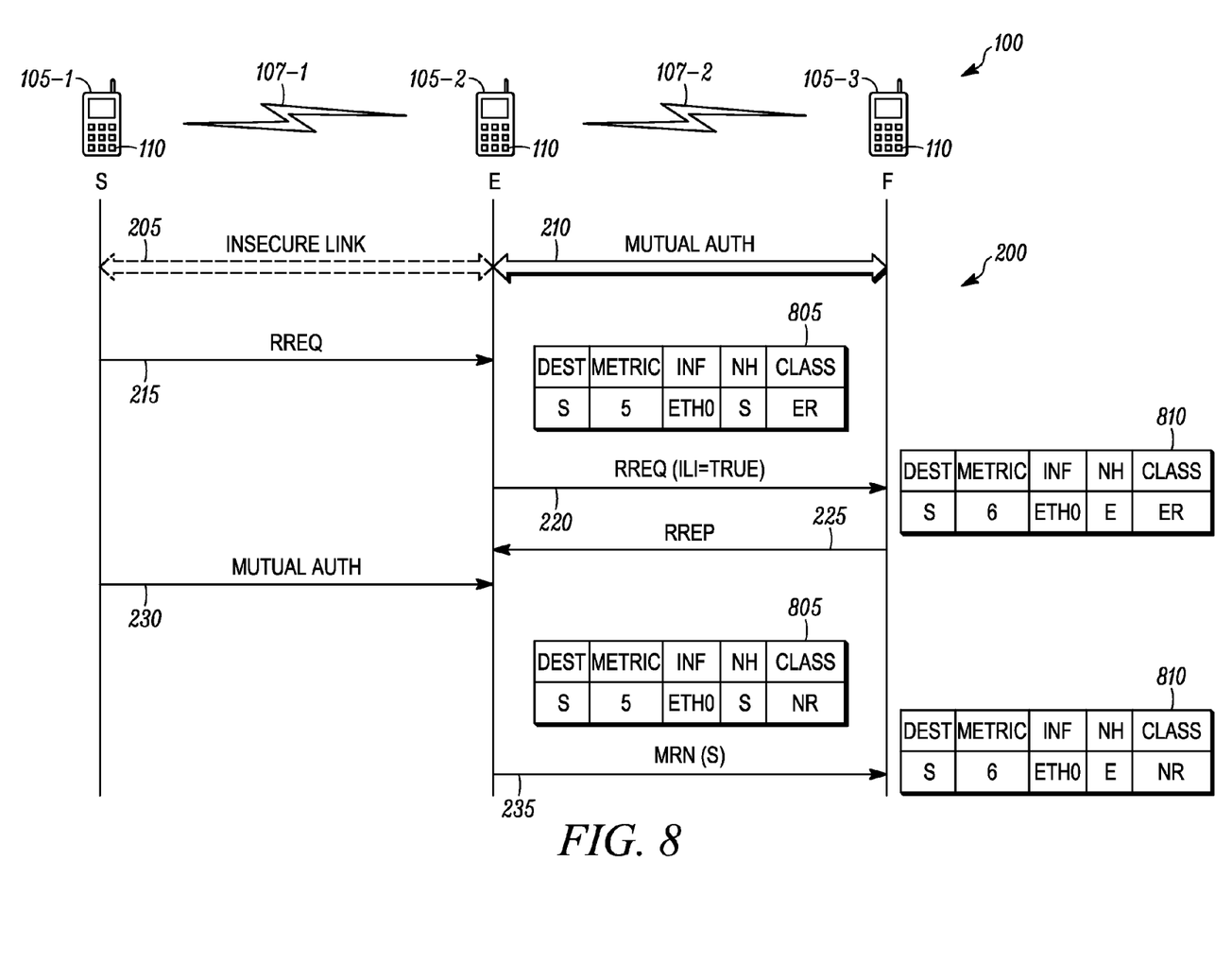
FIG. 8 is a message sequence chart further illustrating a method for establishing a secure route in a wireless communication network, including the use of multi-class routing tables, according to some embodiments of the present invention.

Referring to FIG. 8, a message sequence chart further illustrates the method 200 for establishing a secure route in the wireless communication network 100, including the use of multi-class routing tables, according to some embodiments of the present invention. As described above concerning FIG. 2, line 205 represents that a non-secure RF link exists between the S node 105-1 and the E node 105-2. Line 210 represents that the E node 105-2 and the F node 1053 have been mutually authenticated. At line 215, the S node 105-1 transmits to the E node 105-2 an RREQ message targeted for the F node 105-3. The E node 105-2 then creates a routing table entry that indicates that a direct route to the S node 105-1 is a non-secure, "ephemeral" route by using an "ER" designation in a class field 805.

At line 220, the E node 105-2 forwards the RREQ message to the F node 105-3. Based on an indication in the RREQ message, the F node 105-3 stores in its routing table an indication that a path traversed by the RREQ included a non-secure wireless link, designated as an ephemeral route to the S node 105-1 by using an "ER" designation in a class field 810. Because the E node 105-2 and the F node 105-3 are mutually authenticated, at line 225 the F node 105-3 is able to immediately transmit an RREP message back to the E node 105-2. The receipt of the RREP message, at line 225, by the E node 105-2 triggers the mutual authentication process at line 230. After the mutual authentication process is completed, the E node 105-2 updates its routing table by using an "NR" designation in the class field 805. At line 235, the E node 105-2 transmits to the F node 105-3 a make route normal to S (MRN(S)) message, indicating that the E node 105-2 and the S node 105-1 have been mutually authenticated. The MRN(S) message can be transmitted in response to updating the routing table at the E node 105-2 using the "NR" designation in the class field 805 to indicate that a route to the S node 105-1 has changed from an ephemeral route to a secure route. The F node 105-3 then updates its routing table to indicate that a trusted, unrestricted, "normal" route ("NR(S)") to the S node 105-1 now exists by using an "NR" designation in the class field 810.

Figure 9:
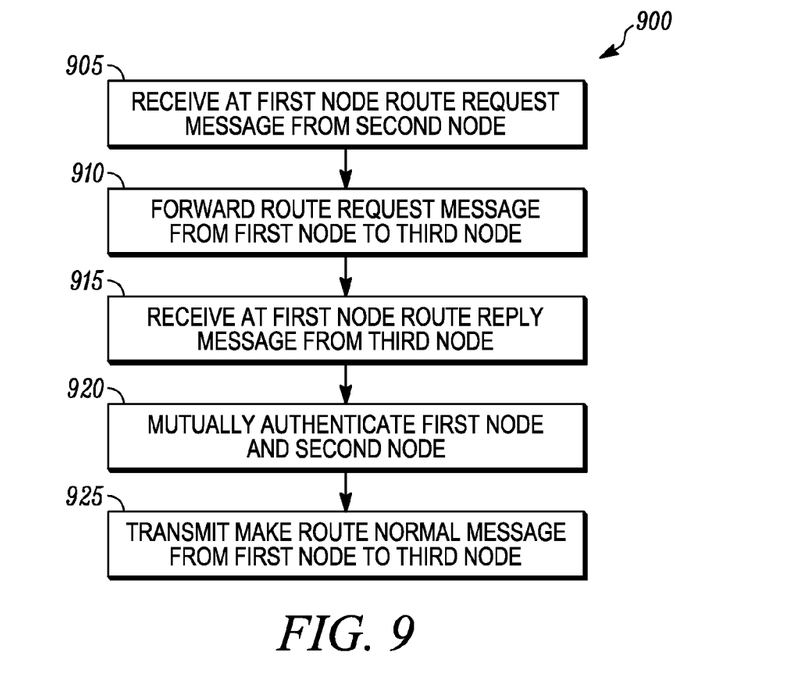
FIG. 9 is a general flow diagram illustrating a method for establishing a secure route in a wireless network, according to some embodiments of the present invention.

Referring to FIG. 9, a general flow diagram illustrates a method 900 for establishing a secure route in a wireless network, according to some embodiments of the present invention. At step 905, a first node in the wireless network receives a route request message from a second node, where the second node and the first node have not been mutually authenticated. For example, in FIG. 2, at line 215, the E node 105-2 receives a RREQ message from the S node 105-1 across a non-secure wireless link.

At step 910, the route request message from the first node is forwarded to a third node. For example, in FIG. 2, at line 220, the E node forwards the RREQ message to the F node 105-3.

At step 915, the first node receives a route reply message from the third node. For example, in FIG. 2, at line 225, the E node 105-2 receives an RREP message from the F node 105-3. As discussed above regarding preliminary RREP messages, the first node and the third node may not have been mutually authenticated when the route reply message is received at the first node. Thus the first node accepts the route reply message as valid only after mutually authenticating the first node and the third node. The route reply message then may be forwarded from the first node to the second node only after the first node accepts the route reply message as valid. Alternatively, the first node may request the third node to retransmit the route reply message, or a signature of the route reply message, after mutually authenticating the first node and the third node. Alternatively, the third node may automatically retransmit the route reply message, or a signature of the route reply message, after mutually authenticating the first node and the third node.

At step 920, the first node is mutually authenticated with the second node, in response to receiving at the first node the route reply message from the third node. For example, in FIG. 2, at line 230, the E node 105-2 and the S node 105-1 are mutually authenticated in response to receiving the RREP message represented by line 225.

At step 925, a make route normal message is transmitted from the first node to the third node, wherein the make route normal (MRN) message indicates that the first node and the second node have been mutually authenticated. For example, in FIG. 2, at line 235, the E node 105-2 transmits an MRN message to the F node 105-3 indicating that a path between the S node 105-1 and the F node 105-3 now includes only secure wireless links.

Figure 10:
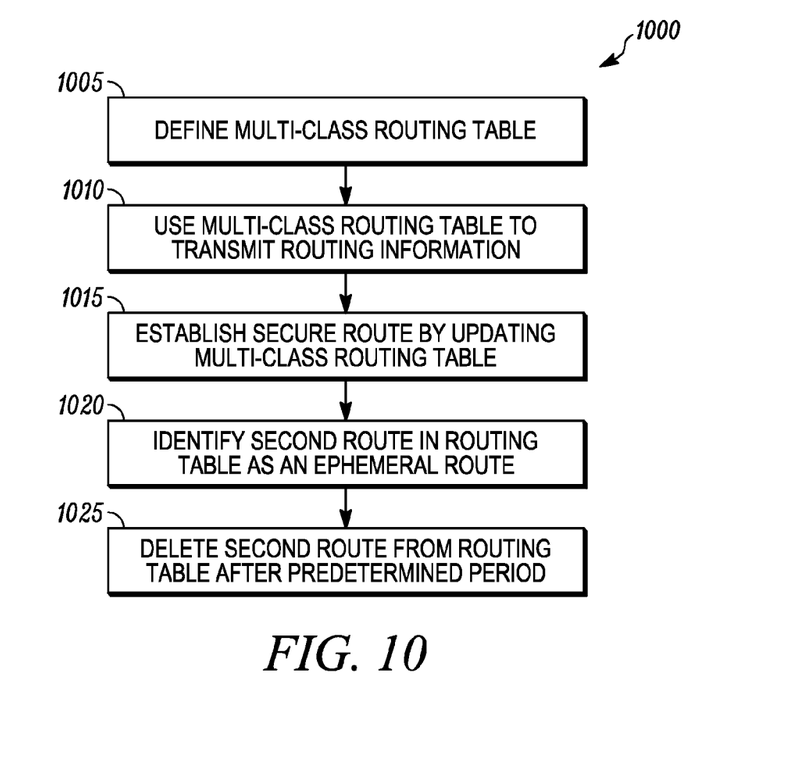
FIG. 10 is a general flow diagram illustrating a method for establishing a temporary route in a wireless network, according to some embodiments of the present invention.

Referring to FIG. 10, a general flow diagram illustrates a method 1000 for establishing a temporary route in a wireless network, according to some embodiments of the present invention. At step 1005, a multi-class routing table is defined that identifies at least one route in the wireless network as an ephemeral route, and where at least one wireless link in the at least one route is a non-secure wireless link. For example, in the method 200 the F node 105-3 defines the routing table that includes the class field 810 identifying the non-secure wireless link to the S node 105-1 as an ephemeral route by using the designation "ER".

At step 1010, the multi-class routing table is used to transmit routing information over the at least one route. For example, the F node 105-3 transmits an RREP message to the E node 105-2 as represented by the line 225.

At step 1015, a secure route is established by updating the multi-class routing table to identify the at least one route in the wireless network as a secure route. For example, after receiving the MRN message represented by line 235, the F node 105-3 updates its routing table to identify the route to the S node 105-1 as a secure, normal route by changing the designation in the class field 810 to "NR".

At step 1020, a second route in the routing table is identified as an ephemeral route. For example, consider that the F node 105-3 receives an RREQ message from the G node 105-4, where an insecure link indication (ILI) field in the RREQ message is set to "true". The F node 105-3 will therefore create a new entry in its routing table and designate the class field 810 for the entry as "ER" to identify an ephemeral route.

At step 1025, the second route from the routing table is deleted if the second route has not changed from an ephemeral route to a secure route after a predetermined period of time. For example, if the F node 105-3 does not receive a make route normal (MRN) message from the G node 105-4 after a predetermined period of time concerning the route that was the subject of the RREQ message, the F node 105-3 will delete the second route from its routing table.

Figure 11:
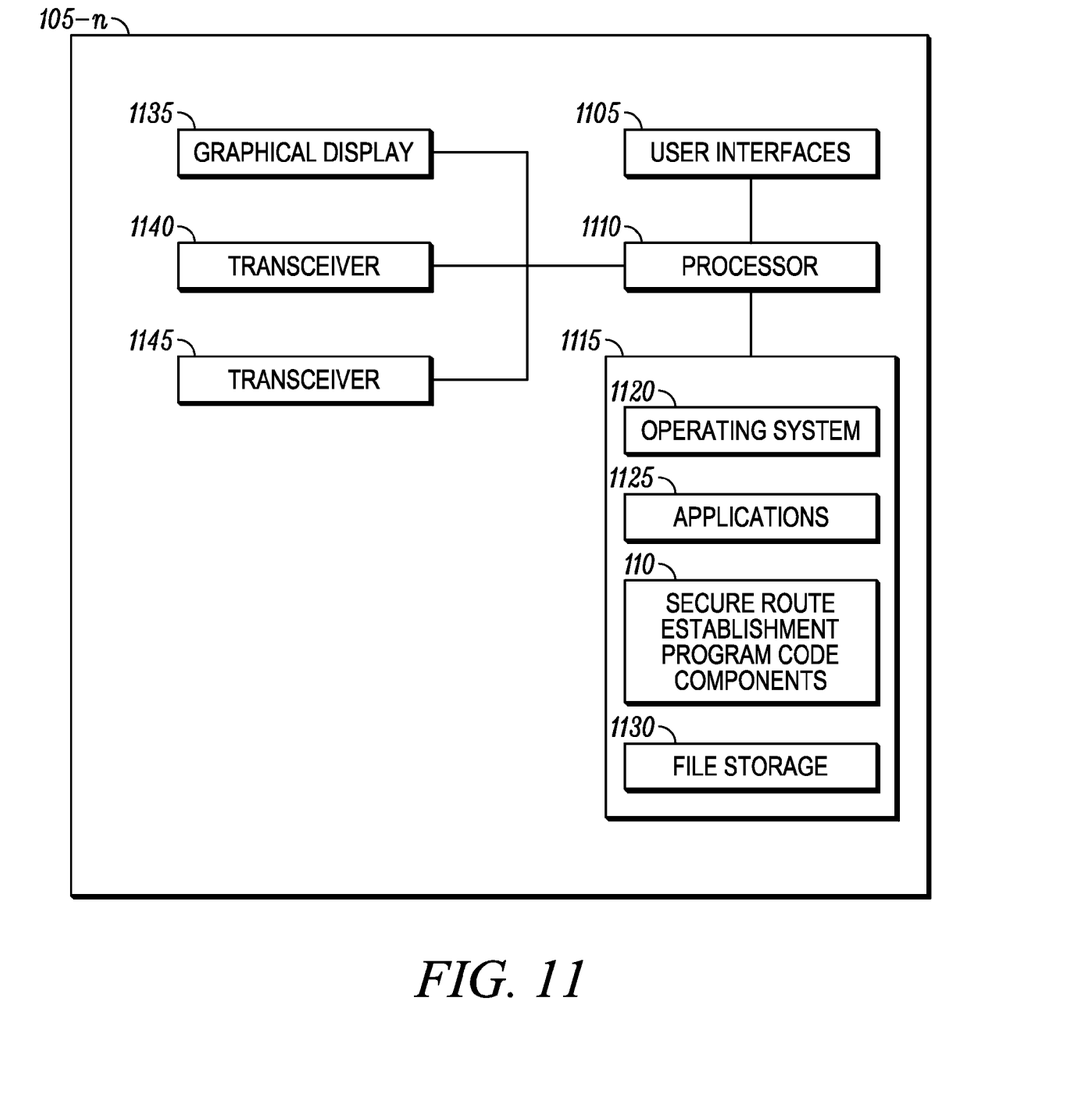
FIG. 11 is a block diagram illustrating components of a wireless communication device that can function as a node in a wireless network, according to some embodiments of the present invention.

Referring to FIG. 11, a block diagram illustrates components of a wireless communication device that can function as a node 105-*n* in the wireless communication network 100, according to some embodiments of the present invention. The node 105-*n* can be, for example, a two-way radio, a mobile telephone, a notebook computer or another type of device operating as a Worldwide Interoperability for Microwave Access (WiMAX) vehicle modem, an Institute of Electrical and Electronics Engineers (IEEE) 802.11i modem, a mesh network vehicular modem, or other type of network node. The node 105-*n* comprises user interfaces 1105 operatively coupled to at least one processor 1110. At least one memory 1115 is also operatively coupled to the processor 1110. The memory 1115 has storage sufficient for an operating system 1120, applications 1125 and general file storage 1130. The general file storage 1130 can store, for example, a trusted neighbor table that is constructed from trusted neighbor lists received in RREQ messages. The user interfaces 1105 can be a combination of user interfaces including, for example, but not limited to a keypad, a touch screen, a microphone and a communications speaker. A graphical display 1135, which can also have a dedicated processor and/or memory, drivers, etc., is operatively coupled to the processor 1110. A number of transceivers, such as a first transceiver 1140 and a second transceiver 1145, are also operatively coupled to the processor 1110. The first transceiver 1140 and the second transceiver 1145 communicate with various wireless communications networks, such as the wireless communication network 100, using various standards such as, but not limited to, Evolved Universal Mobile Telecommunications Service Terrestrial Radio Access (E-UTRA), Universal Mobile Telecommunications System (UMTS), Enhanced UMTS (E-UMTS), Enhanced High Rate Packet Data (E-HRPD), Code Division Multiple Access 2000 (CDMA2000), Institute of Electrical and Electronics Engineers (IEEE) 802.11, IEEE 802.16, and other standards.

It is to be understood that FIG. 11 is for illustrative purposes only and includes only some components of a node 105-*n*, in accordance with some embodiments of the present invention, and is not intended to be a complete schematic diagram of the various components and connections between components required for all devices that may implement various embodiments of the present invention.

The memory 1115 comprises a computer readable medium that records the operating system 1120, the applications 1125, and the general file storage 1130. The computer readable medium also comprises the computer readable program code components 110 concerning establishing a secure route in a wireless network. When the computer readable program code components 110 are processed by the processor 1110, they are configured to cause execution of the method 200, the method 500, the method 600, the method 900 or the method 1000 for establishing a secure route or a temporary route in a wireless network, as described above, according to some embodiments of the present invention.

Advantages of the present invention thus include enabling nodes in an ad hoc network to form security associations with only particular neighboring nodes, which improves network efficiency by reducing time and processor resources that could be otherwise required to mutually authenticate all neighboring nodes. Nodes that authenticate with a network can thus maintain only an initial security association with the network, until a routing event triggers a need for a new security association. Use of make route normal (MRN) messages can indicate that a particular node has become authenticated to a network, and that a previously non-secure network route has become a secure network route. Further, a trusted neighbor list in a route request (RREQ) message can be used to identify trusted neighboring nodes and, for example, determine secure routes for transmitting keying material to assist in mutually authenticating network nodes.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for establishing a secure route in a wireless network, the method comprising:
   receiving at a first node in the wireless network a route request message from a second node, where the second node and the first node have not been mutually authenticated;
   identifying, by the first node, a direct route to the second node as an ephemeral route, wherein the ephemeral route comprises a non-secure route for forwarding routing information and not forwarding user data packets;
   forwarding the route request message including an indication of the ephemeral route between the first node and the second node from the first node to a third node;
   transmitting a route reply message from the third node to the first node;
   triggering a mutual authentication between the first node and the second node, in response to receiving at the first node the route reply message from the third node; and
   forwarding the route reply message from the first node to the second node in response to the mutual authentication,
   wherein the route request message received at the first node comprises an insecure link indication field set to "false", and the insecure link indication field is set to "true" when the route request message is forwarded from the first node to the third node, whereby the first node indicates that it is first to receive the route request message over a non-secure link.

2. The method of claim 1, further comprising:
   transmitting a make route normal message from the first node to the third node, wherein the make route normal message indicates that the first node and the second node have been mutually authenticated.

3. The method of claim 2, wherein the make route normal message is transmitted in response to updating a multi-class routing table at the first node to indicate that a route to the second node has changed from an ephemeral route to a secure route.

4. The method of claim 1, wherein an insecure link indication field in the route request message forwarded from the first node to the third node indicates that a path traversed by the route request message includes a non-secure wireless link.

5. The method of claim 4, wherein the insecure link indication field is included as a flag in a header of the route request message.

6. The method of claim 1, wherein the route request message includes a trusted neighbor list identifying trusted nodes that have mutually authenticated with a node that originated the route request message.

7. The method of claim 6, wherein the node that originated the route request message is the second node, and the trusted neighbor list is used to identify nodes through which keying material can be transmitted from the first node to the second node to assist mutually authenticating the first node and the second node.

8. The method of claim 1, wherein the make route normal message indicates that a route between a node that originated the route request message and the third node includes only secure wireless links.

9. The method of claim 1, wherein the make route normal message indicates that the first node has been authenticated to the wireless network and that the third node can indicate in a routing table that a route to the first node includes only secure wireless links.

10. The method of claim 1, wherein the first node and the third node have not been mutually authenticated when the route reply message is received at the first node, and the first node accepts the route reply message as valid only after mutually authenticating the first node and the third node.

11. The method of claim 10, wherein the first node requests the third node to retransmit the route reply message, or a signature of the route reply message, after mutually authenticating the first node and the third node.

12. The method of claim 10, wherein the third node automatically retransmits the route reply message, or a signature of the route reply message, after mutually authenticating the first node and the third node.

13. A wireless communication device for establishing a secure route in a wireless network, the device comprising:

a transceiver for receiving at the wireless communication device a route request message from a second node, where the second node and the wireless communication device have not been mutually authenticated, for forwarding the route request message including an indication of the ephemeral route between the wireless communication device and the second node from the wireless communication device to a third node, and further for receiving at the wireless communication device a route reply message from the third node; and a processor for identifying a direct route to the second node as an ephemeral route, wherein the ephemeral route comprises a non-secure route for forwarding routing information and not forwarding user data packets in response to receiving the route request, and for mutually authenticating the wireless communication device with the second node in response to receiving the route reply message prior to forwarding the route reply message to the second node, wherein the route request message received at the first node comprises an insecure link indication field set to "false", and the insecure link indication field is set to "true" when the route request message is forwarded from the first node to the third node, whereby the first node indicates that it is first to receive the route request message over a non-secure link.

14. The device of claim 13, the transceiver further for transmitting a make route normal message from the wireless communication device to the third node, wherein the make route normal message indicates that the wireless communication device and the second node have been mutually authenticated.

15. The device of claim 13, wherein an insecure link indication field in the route request message forwarded from the wireless communication device to the third node indicates that a path traversed by the route request message includes a non-secure wireless link.

* * * * *

UNITED STATES PATENT AND TRADEMARK OFFICE
CERTIFICATE OF CORRECTION

| | | |
|---|---|---|
| PATENT NO. | : 8,161,283 B2 | Page 1 of 1 |
| APPLICATION NO. | : 11/680359 | |
| DATED | : April 17, 2012 | |
| INVENTOR(S) | : Metke et al. | |

It is certified that error appears in the above-identified patent and that said Letters Patent is hereby corrected as shown below:

In Column 9, Line 20, delete "1053" and insert -- 105-3 --, therefor.

Signed and Sealed this
Eighteenth Day of December, 2012

David J. Kappos
*Director of the United States Patent and Trademark Office*